US012639901B2

(12) United States Patent
Domae et al.

(10) Patent No.:  US 12,639,901 B2
(45) Date of Patent:         May 26, 2026

(54) INFORMATION PROCESSING DEVICE, INFORMATION PROCESSING TERMINAL, INFORMATION PROCESSING METHOD, AND PROGRAM

(71) Applicants:SONY GROUP CORPORATION, Tokyo (JP); Sony Interactive Entertainment Inc., Tokyo (JP)

(72) Inventors: Takuma Domae, Tokyo (JP); Junichi Tanaka, Tokyo (JP); Kazuharu Tanaka, Tokyo (JP); Masaaki Matsubara, Tokyo (JP); Yasunori Matsui, Tokyo (JP)

(73) Assignees: SONY GROUP CORPORATION, Tokyo (JP); Sony Interactive Entertainment Inc., Tokyo (JP)

( * ) Notice:    Subject to any disclaimer, the term of this patent is extended or adjusted under 35 U.S.C. 154(b) by 255 days.

(21) Appl. No.:    18/275,920

(22) PCT Filed:    Feb. 28, 2022

(86) PCT No.:    PCT/JP2022/008128
§ 371 (c)(1),
(2) Date:    Aug. 4, 2023

(87) PCT Pub. No.: WO2022/190917
PCT Pub. Date: Sep. 15, 2022

(65) Prior Publication Data
US 2024/0303947 A1    Sep. 12, 2024

(30) Foreign Application Priority Data
Mar. 9, 2021    (JP) ................................. 2021-037070

(51) Int. Cl.
*G06T 19/20*        (2011.01)
*G06T 13/40*        (2011.01)
(52) U.S. Cl.
CPC .............. *G06T 19/20* (2013.01); *G06T 13/40* (2013.01); *G06T 2219/2004* (2013.01)
(58) Field of Classification Search
CPC . G06T 19/20; G06T 13/40; G06T 2219/2004; G06T 19/00; A63F 13/56;
(Continued)

(56) References Cited

U.S. PATENT DOCUMENTS

2021/0397245 A1* 12/2021 Ohata ................... A63F 13/825
2022/0083126 A1    3/2022 Iwaki

FOREIGN PATENT DOCUMENTS

JP            6220917  B2    10/2017
JP        2018-094326  A      6/2018
(Continued)

*Primary Examiner* — Chong Wu
(74) *Attorney, Agent, or Firm* — Paratus Law Group, PLLC

(57)        ABSTRACT

An information processing device includes a control unit that performs control to output information regarding an image of a user viewpoint in a virtual space to a user terminal, in which the control unit acquires a characteristic of at least one user related to an event performed in the virtual space and controls movement of a position of an indicator corresponding to a performer in the virtual space based on a position of an indicator corresponding to at least one user whose characteristic satisfies a condition.

8 Claims, 5 Drawing Sheets

(58) Field of Classification Search
CPC ........ A63F 13/573; A63F 13/79; G06F 3/011;
H04N 21/44012; H04N 21/4788; H04N
21/816
See application file for complete search history.

(56) References Cited

FOREIGN PATENT DOCUMENTS

| | | | |
|---|---|---|---|
| JP | 6514397 | B1 | 5/2019 |
| JP | 2020-009027 | A | 1/2020 |
| WO | WO 2020/095368 | A1 | 5/2020 |
| WO | WO 2020/202616 | A1 | 10/2020 |

* cited by examiner

20 : DISTRIBUTION SERVER

FIG.5

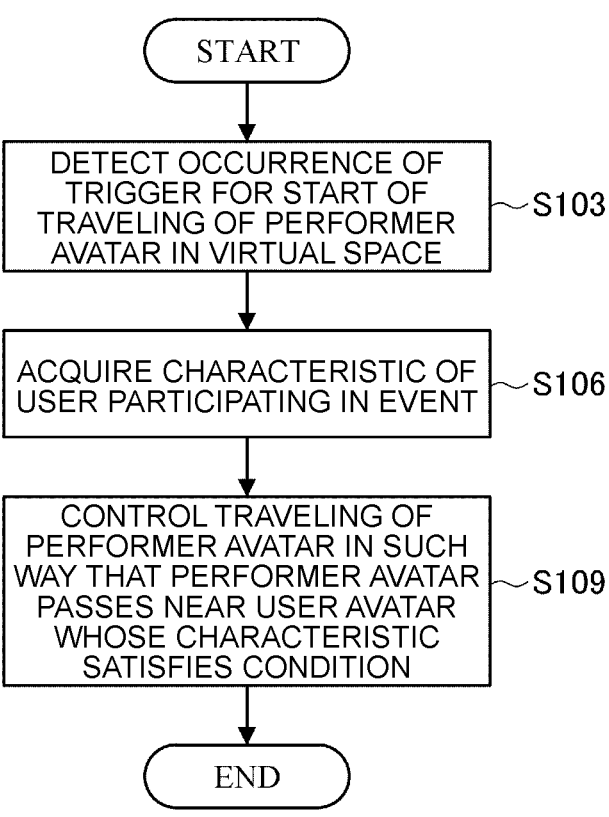

START

DETECT OCCURRENCE OF TRIGGER FOR START OF TRAVELING OF PERFORMER AVATAR IN VIRTUAL SPACE ~S103

ACQUIRE CHARACTERISTIC OF USER PARTICIPATING IN EVENT ~S106

CONTROL TRAVELING OF PERFORMER AVATAR IN SUCH WAY THAT PERFORMER AVATAR PASSES NEAR USER AVATAR WHOSE CHARACTERISTIC SATISFIES CONDITION ~S109

END

FIG.6

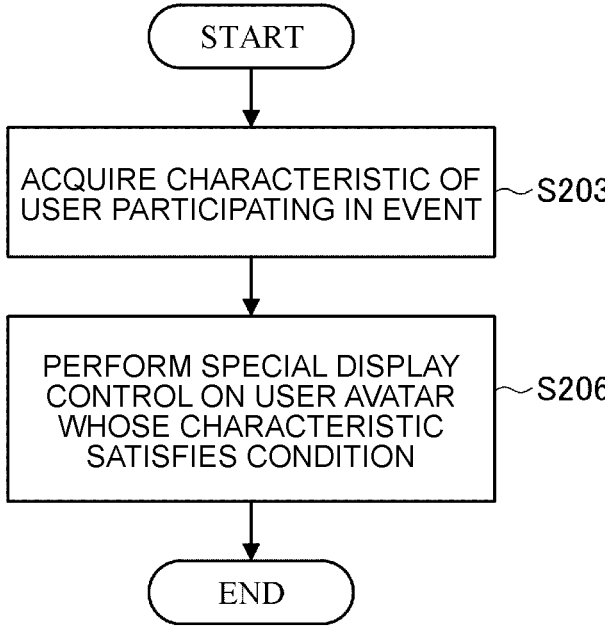

START

ACQUIRE CHARACTERISTIC OF USER PARTICIPATING IN EVENT ~S203

PERFORM SPECIAL DISPLAY CONTROL ON USER AVATAR WHOSE CHARACTERISTIC SATISFIES CONDITION ~S206

END

INFORMATION PROCESSING DEVICE, INFORMATION PROCESSING TERMINAL, INFORMATION PROCESSING METHOD, AND PROGRAM

CROSS REFERENCE TO PRIOR APPLICATION

This application is a National Stage Patent Application of PCT International Patent Application No. PCT/JP2022/008128 (filed on Feb. 28, 2022) under 35 U.S.C. § 371, which claims priority to Japanese Patent Application No. 2021-037070 (filed on Mar. 9, 2021), which are all hereby incorporated by reference in their entirety.

FIELD

The present disclosure relates to an information processing device, an information processing terminal, an information processing method, and a program.

BACKGROUND

In a virtual reality (VR) technology that has become widespread in recent years, a video from an arbitrary viewpoint (free viewpoint) according to a user operation in a virtual space in which a 3D model is arranged is generated and provided to a user. The user can view the video (image and sound) of the virtual space by using a display device such as a smartphone, a tablet terminal, a television device, or a non-transmissive head mounted display (HMD) covering the entire field of view.

As one of the ways to more enjoy the experience in the virtual space, an avatar corresponding to the user can freely move around in the virtual space. For example, Patent Literature 1 below describes that an avatar corresponding to each of a plurality of users is displayed in a distribution room (virtual space) in a system that distributes a real-time moving image to a viewer (user).

CITATION LIST

Patent Literature

Patent Literature 1: JP 6220917 B2

SUMMARY

Technical Problem

However, when an event such as a concert is performed by a distributor side (performer) in a virtual space, there is a case where interaction between the performer and a user is not sufficient. Furthermore, in the above Patent Literature, in the distribution room, only a moving image showing a distribution user (distributor side) is arranged on a moving image display object such as a screen on a stage, and the position of the distributor does not move, and thus, the user may feel bored.

Therefore, the present disclosure proposes an information processing device, an information processing terminal, an information processing method, and a program capable of improving connection between a performer and a viewer in a virtual space.

Solution to Problem

According to the present disclosure, an information processing device is provided that includes:

a control unit that performs control to output information regarding an image of a user viewpoint in a virtual space to a user terminal, wherein the control unit acquires a characteristic of at least one user related to an event performed in the virtual space and controls movement of a position of an indicator corresponding to a performer in the virtual space based on a position of an indicator corresponding to at least one user whose characteristic satisfies a condition.

According to the present disclosure, an information processing terminal is provided that includes:

a control unit that performs control to display an image of a user viewpoint in a virtual space on a display unit, wherein the control unit acquires a characteristic of a user related to an event performed in the virtual space and controls movement of a position of an indicator corresponding to a performer in the virtual space based on a position of an indicator corresponding to the user in a case where the characteristic satisfies a condition.

According to the present disclosure, an information processing method is provided that executed by a processor, the information processing method includes:

performing control to output information regarding an image of a user viewpoint in a virtual space to a user terminal; and acquiring a characteristic of at least one user related to an event performed in the virtual space and controlling movement of a position of an indicator corresponding to a performer in the virtual space based on a position of an indicator corresponding to at least one user whose characteristic satisfies a condition.

According to the present disclosure, a program is provided that causes a computer to function as:

a control unit that performs control to output information regarding an image of a user viewpoint in a virtual space to a user terminal, wherein the control unit acquires a characteristic of at least one user related to an event performed in the virtual space and controls movement of a position of an indicator corresponding to a performer in the virtual space based on a position of an indicator corresponding to at least one user whose characteristic satisfies a condition.

BRIEF DESCRIPTION OF DRAWINGS

FIG. 5 is a flowchart illustrating an example of a flow of operation processing for performer avatar traveling control based on a characteristic of a user according to the present embodiment.

FIG. 6 is a flowchart illustrating an example of a flow of operation processing for user avatar display control based on a characteristic of a user according to a modified example of the present embodiment.

DESCRIPTION OF EMBODIMENTS

Hereinafter, preferred embodiments of the present disclosure will be described in detail with reference to the accompanying drawings. Note that, in the present specification and the drawings, components having substantially the same functional configuration are denoted by the same reference signs, and an overlapping description is omitted.

Further, the description will be given in the following order.

1. Overview of Information Processing System According to Embodiment of Present Disclosure
2. Configuration Example
2-1. Configuration example of Distribution Server 20
2-2. Configuration Example of User Terminal 10
3. Performer Avatar Traveling Control Based on Characteristic of User
4. Modified Example
5. Supplement

Figure 1:
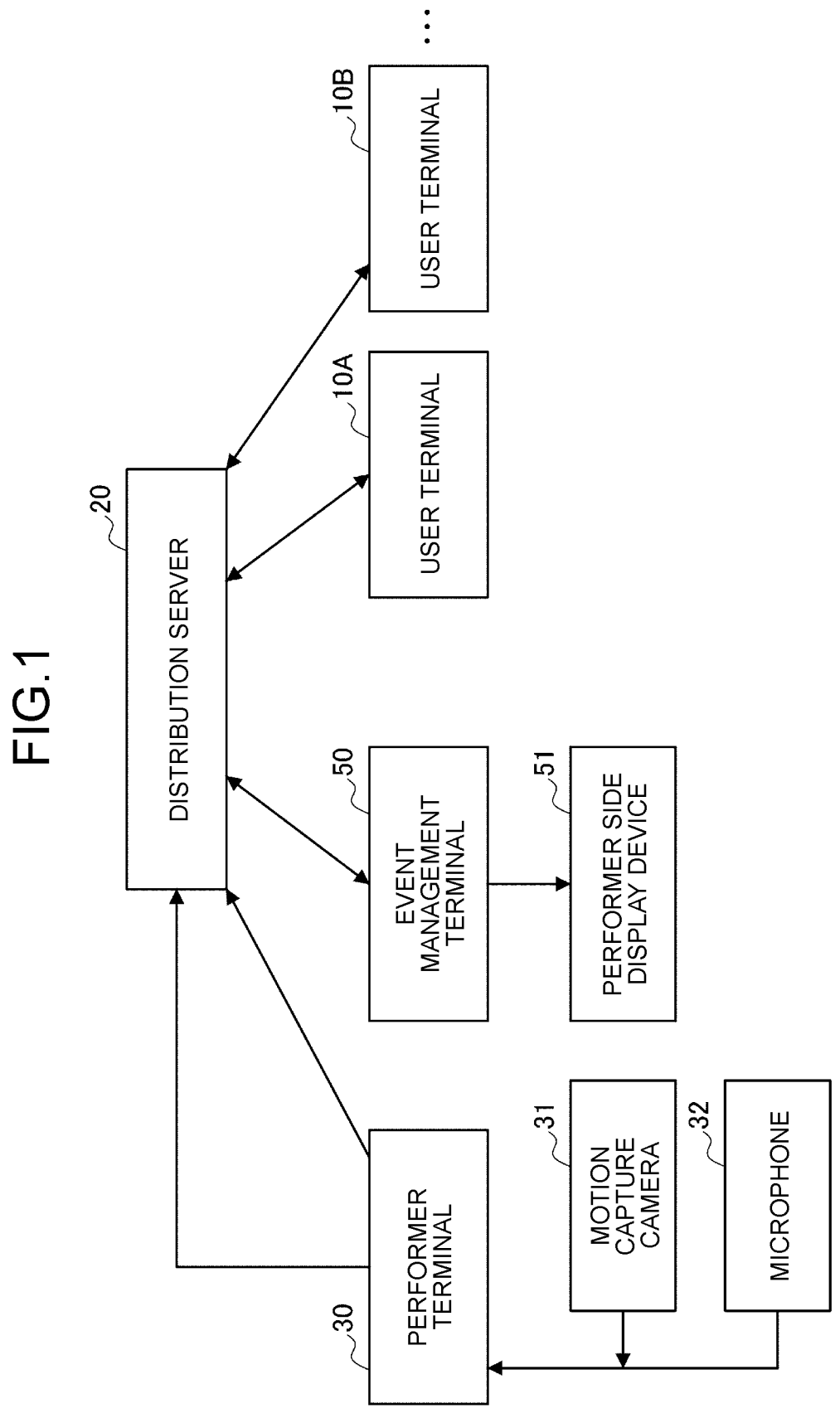
FIG. 1 is a diagram for describing an overview of an information processing system according to an embodiment of the present disclosure.

1. Overview of Information Processing System According to Embodiment of Present Disclosure FIG. 1 is a diagram for describing an overview of an information processing system according to an embodiment of the present disclosure. As illustrated in FIG. 1, the information processing system according to the present embodiment includes a user terminal 10, a distribution server 20, a performer terminal 30, and an event management terminal 50.

The distribution server 20 is an information processing device that manages a virtual space (VR: Virtual Reality) in which 3D models are arranged and distributes a video of an arbitrary viewpoint (a performer viewpoint or a user viewpoint) in the virtual space. The distribution server 20 may be a distribution system including a plurality of servers.

The user terminal 10 is an information processing terminal used by a user, and is implemented by, for example, a smartphone, a tablet terminal, a personal computer (PC), a non-transmissive head mounted display (HMD) that covers the entire field of view, a transmissive glasses-type device, a projector, or the like. The user terminal 10 outputs video data (image) of the user viewpoint and sound (display output and sound output) in the virtual space received from the distribution server 20. In addition, the user terminal 10 acquires information for the virtual space input from the user and transmits the information to the distribution server 20. The distribution server 20 changes the user viewpoint (a position and direction of a virtual camera) in the virtual space according to the input information from the user or reflects the input information on a 3D object in the virtual space. Furthermore, a user avatar serving as a virtual self of the user may exist in the virtual space. The user avatar is included in the 3D objects arranged in the virtual space, and is generated by, for example, a character 3D model. The user avatar makes a motion, changes an expression, or moves according to the input information from the user. The user viewpoint (the position and direction of the virtual camera) in the virtual space may be a viewpoint of the user avatar, or may be a viewpoint that fits the user avatar within the angle of view.

The performer terminal 30 acquires input information from a performer and transmits the input information to the distribution server 20. In the virtual space, there is a performer avatar serving as a virtual self of the performer, and the performer avatar makes a motion, changes an expression, or moves according to the input information from the performer. The performer avatar is included in the 3D objects arranged in the virtual space. Examples of the input information transmitted to the distribution server 20 include motion data (motions of the limbs, a motion of the head, a facial expression, a change in posture, and the like) indicating the motion of the performer and sound data. For example, the performer avatar is generated by 3D model data, and the performer avatar can be moved by applying the motion data of the performer.

The motion data is acquired by, for example, a motion capture camera 31 that images the performer in the real space. In the present embodiment, a case where the motion data is acquired by a camera is described as an example, but the present disclosure is not limited thereto. For example, the motion data of the performer may be acquired by various sensors (an acceleration sensor, a gyro sensor, or the like) attached to the performer. Furthermore, the motion data of the performer may be acquired by combining various sensors and a camera.

The sound data is acquired by a microphone 32 attached to the performer himself/herself, held by the performer, or arranged around the performer in the real space. Sounds collected by a plurality of microphones 32 arranged in the real space may be synthesized and transmitted to the distribution server 20. In addition, sound data (audio data) output from a musical instrument played by the performer, a CD player, a digital player, or the like is also transmitted to the distribution server 20 by the performer terminal 30 as the sound data provided from the performer. Furthermore, the sound data transmitted from the performer terminal 30 to the distribution server 20 may be a sound obtained by individually adjusting various sound sources by a mixer arranged in the real space and then mixing the various sound sources.

The event management terminal 50 is an information processing terminal used at the time of operating progress and production of an event performed in the virtual space. The event management terminal 50 is operated by, for example, an event manager. The event manager may be the performer himself or herself or a person other than the performer. A person involved in holding of an event including a performer who appears in the event and a manager is also widely referred to as a distributor side.

Furthermore, the video and the sound of the event performed in the virtual space can be transmitted from the distribution server 20 to the event management terminal 50. The event video may be a video of a plurality of viewpoints in the virtual space. For example, the event video may be a video (a video of the performer viewpoint) of audience seats (for example, an area where the user avatar is arranged) viewed from a stage in a venue of the event performed in the virtual space. In addition, the event video may be a video of the stage viewed from the front, from the side, or from above. Furthermore, the event video may be a video in which the entire event venue including the stage and the audience seats can be seen. Such an event video may be displayed on a display unit of the event management terminal 50, or may be displayed on a performer side display device 51 arranged at a position where the performer can be easily seen in the real space or the like. Furthermore, a plurality of performer side display devices 51 may be prepared, and event videos of different viewpoints in the virtual space may be displayed. The performer can check a state of an audience (user avatar) in the virtual space, a state of the stage, a state of the performer avatar of the performer, and the like in real time by viewing the performer side display device 51.

Summary of Problems

When an event such as a concert or a lecture is held in a virtual space, there is a case where interaction between a performer and a user who views the event is not sufficient. Simply displaying a video of a performer on a 3D object such as a screen arranged in a virtual space is not different from watching a video on a television screen, and thus, users may feel bored.

Therefore, in the information processing system according to the present disclosure, it is possible to improve connection between a performer and a viewer in a virtual space.

Specifically, for example, when a concert event is held in a virtual space and user avatars respectively corresponding to a plurality of users are arranged at an event venue, as one of production of the concert, control is performed in such a way that a performer interactively moves in the event venue (in the virtual space) according to a situation of the user avatars. Such movement of the performer is referred to as "traveling" in the present specification.

Figure 2:
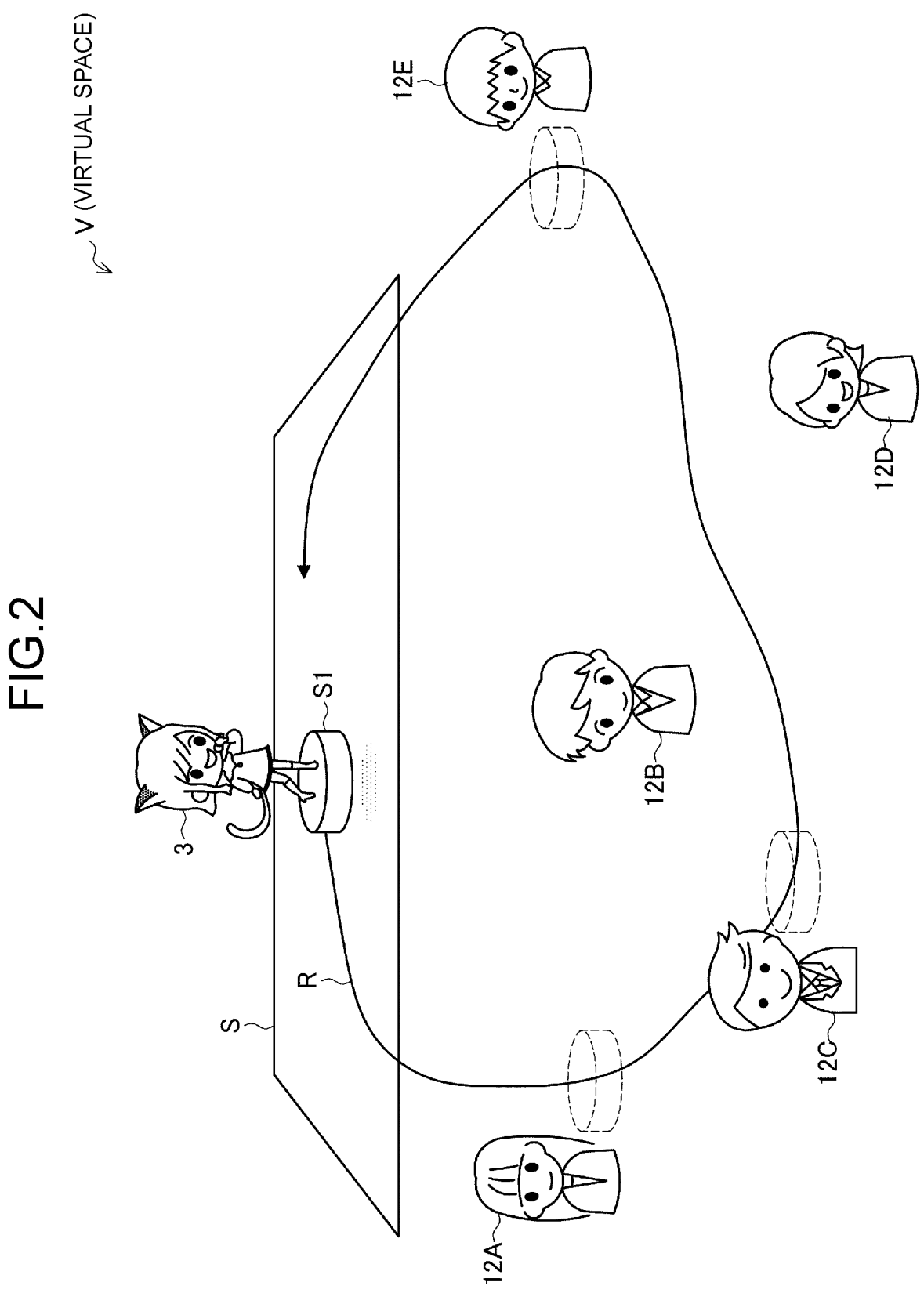
FIG. 2 is a diagram for describing traveling of a performer in an event performed in a virtual space according to the present embodiment.

FIG. 2 is a diagram for describing traveling of a performer in an event performed in a virtual space according to the present embodiment. As illustrated in FIG. 2, a performer avatar 3 performs on, for example, a stage S, in a virtual space V (event venue). Here, in the present embodiment, as one of production of the concert, control is performed in such a way that the performer avatar 3 rides on a small stage S1 and travels around an audience area where user avatars 12 corresponding to a plurality of users are arranged. The displayed small stage S1 is an example, and a vehicle of the performer avatar 3 is not limited thereto. Furthermore, in the performance, the performer avatar 3 may fly alone without displaying a vehicle (object). Each of the plurality of user avatars 12 displayed in the audience area is a 3D object that moves in the virtual space or moves the limbs in accordance with real-time input information from the user in the real space. Each user terminal displays a video of a viewpoint of the corresponding user avatar or a viewpoint from behind the corresponding user avatar.

A traveling route R of the performer avatar 3 is interactively set based on a characteristic of the user avatar 12. For example, control may be performed in such a way that the performer avatar 3 sequentially passes near user avatars satisfying a predetermined condition such as a user avatar making a powerful cheering motion, a user avatar whose charge amount is large, or a user avatar who participated in the events of the performer a large number of times. In the example illustrated in FIG. 2, for example, the traveling route R is set to a traveling route that sequentially passes near a user avatar 12A, a user avatar 12C, and a user avatar 12E. As a result, the performer avatar can interactively respond to a user operating the user avatar to make a more powerful cheering motion, paying a charge, participating in the events of the performer many times (contribution to the performer in a broad sense), and the like by making a motion of approaching particularly close to the user avatar, thereby improving connection between the performer and the viewer in the virtual space.

The overview of the information processing system according to the embodiment of the present disclosure has been described above. Subsequently, a specific configuration of each device included in the information processing system according to the present embodiment will be described with reference to the drawings.

2. Configuration Example

<2-1. Configuration Example of Distribution Server 20>

Figure 3:
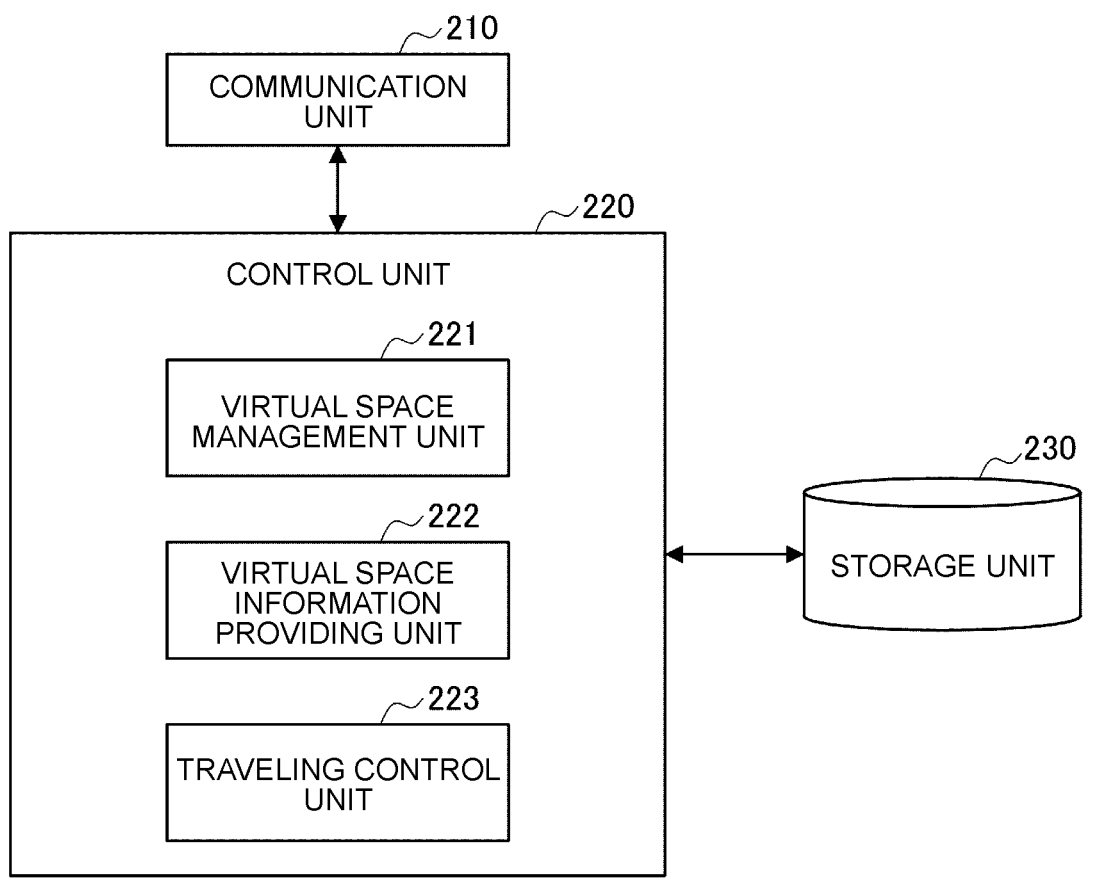
FIG. 3 is a block diagram illustrating an example of a configuration of a distribution server according to the present embodiment.

FIG. 3 is a block diagram illustrating an example of a configuration of the distribution server 20 according to the present embodiment. The distribution server 20 is a server communicably connected to the user terminal 10 and the event management terminal 50 via a network. The distribution server 20 may be a cloud server including a plurality of servers.

As illustrated in FIG. 3, the distribution server 20 includes a communication unit 210, a control unit 220, and a storage unit 230.

(Communication Unit 210)

The communication unit 210 transmits and receives data to and from an external device in a wired or wireless manner. The communication unit 210 is communicably connected to the user terminal 10 and the event management terminal 50 by using, for example, a wired/wireless local area network (LAN), Wi-Fi (registered trademark), Bluetooth (registered trademark), a mobile communication network (long term evolution (LTE), the fourth generation mobile communication system (4G), the fifth generation mobile communication system (5G)), or the like.

(Control Unit 220)

The control unit 220 functions as an arithmetic processing device and a control device, and controls an overall operation in the distribution server 20 according to various programs. The control unit 220 is implemented by, for example, an electronic circuit such as a central processing unit (CPU) or a microprocessor. Furthermore, the control unit 220 may include a read only memory (ROM) that stores programs, operational parameters, and the like to be used, and a random access memory (RAM) that temporarily stores parameters and the like that change as appropriate.

Furthermore, the control unit 220 according to the present embodiment also functions as a virtual space management unit 221, a virtual space information providing unit 222, and a traveling control unit 223.

The virtual space management unit 221 manages a virtual space. Specifically, the virtual space management unit 221 acquires, adds, updates, and the like various types of information (information of 3D objects arranged in a virtual space, and the like) for generating (constructing) the virtual space. For example, the virtual space management unit 221 appropriately reflects input information transmitted from the user terminal 10, the performer terminal 30, and the event management terminal 50 in the virtual space. For example, the virtual space management unit 221 moves the limbs or posture of a user avatar of a user arranged in the virtual space or moves the position of the user avatar forward, backward, leftward, or rightward in accordance with the input information from the user terminal 10 (also changes the position of a virtual camera corresponding to the user viewpoint in accordance with the input information). In addition, the virtual space management unit 221 controls execution of an event in the virtual space in accordance with the information transmitted from the event management terminal 50. The event performed in the virtual space is assumed to be, for example, a concert, a lecture, a play, a festival, or various other events. Furthermore, the virtual space management unit 221 grasps an ID, a position, and the like of a performer avatar and each user avatar in the virtual space. In addition, the event such as a concert held in the virtual space may be an event in which a performer performs in real time, or may be an event in which performance of a performer is recorded in advance.

The virtual space information providing unit 222 provides information regarding the virtual space to the user terminal 10 and the event management terminal 50. The information regarding the virtual space may be information stored in the storage unit 230 or may be information generated by the virtual space information providing unit 222 based on the information stored in the storage unit 230. More specifically, the information regarding the virtual space may be video data of the user viewpoint in the virtual space. The video data of each user viewpoint in the virtual space is continuously transmitted to each user terminal 10 in real time (so-called VR streaming distribution) and displayed on each user terminal 10, so that a plurality of users can share the same virtual space and simultaneously view the video data.

Furthermore, the information regarding the virtual space may be data for generating a video of the user viewpoint in the virtual space. Examples of the data for generating the video of the user viewpoint in the virtual space include position/posture information of each 3D object (including avatars of performers and other users) arranged in the virtual space, three-dimensional position coordinates of the virtual camera corresponding to the user viewpoint in the virtual space, and the like. Such data is continuously transmitted to each user terminal 10 in real time, and a video of the user viewpoint is generated and displayed in real time in each user terminal 10, so that a plurality of users can share the same virtual space and simultaneously view the video. The user terminal 10 can also acquire information for constructing the virtual space from the distribution server 20 in advance before participating in the event, and construct the virtual space locally. In this case, during the event, update information of the virtual space (information regarding a change in virtual space or the like) is continuously transmitted from the distribution server 20, and the user terminal 10 updates the locally constructed virtual space based on the update information. Furthermore, the user terminal 10 controls the position and direction of the virtual camera in the locally constructed virtual space according to the input information from the user, and can generate and display the video of the user viewpoint.

The traveling control unit 223 performs control in such a way that the performer avatar in the virtual space travels (moves) in an area in which the user avatar corresponding to the user is arranged based on a characteristic of the user who views the performer avatar. The "characteristic of the user" can also include a characteristic of the user avatar (such as the position or motion of the user avatar). The traveling control unit 223 may determine the traveling route based on the characteristic of the user and then control movement of the performer avatar. For example, the traveling control unit 223 controls the traveling route of the performer avatar (movement of a display position of the performer avatar) based on the positions of the user avatars corresponding to one or more users whose predefined characteristics satisfy a condition. The traveling route is set to pass near the position of the user avatar that satisfies the condition. In a case where there are a plurality of user avatars satisfying the condition, the traveling route is set to sequentially pass near the user avatars. Furthermore, for example, the traveling control unit 223 sets the traveling route that has a stage on which the performer avatar is positioned as the start point and sequentially passes near the user avatar that satisfies the condition and returns to the start point. Such traveling of the performer avatar can be performed as one of production of a concert. The traveling may start, for example, according to an instruction from the event management terminal 50, according to a situation of the event (for example, a case where the situation of the event satisfies a predetermined condition), or according to an instruction (a gesture or the like) of the performer avatar. The case where the situation of the event satisfies the predetermined condition may be a case where special performance is performed, a specific time zone in the music, or the like.

Furthermore, the characteristic of the user is user information related to the event performed in the virtual space (or the performer). Examples of the characteristic of the user can include a charge amount for the event or the performer, the number of times the user participated in the event in which the performer appears, a motion of the user avatar in the event (the number of times the user avatar waves a hand, the amplitude of a motion, the number of jumps, and the like), a rank (position) of the user in the event, a successful person of the event (for example, a person who has succeeded in some missions in the event), and the position of the user avatar (for example, the user avatar is located in a place where a density of the user avatars is high in the audience area).

The traveling route may be set to a different route for each user (for each user terminal). For example, the traveling control unit 223 may set a route for traveling near each user avatar for all the user terminals 10.

Furthermore, when the virtual space is divided into rooms into which several tens of user avatars can enter, and the same concert is simultaneously performed in the respective rooms, the traveling route may be set for each room. The traveling control unit 223 individually sets the traveling route for each room based on the characteristic of the user corresponding to the user avatar present in each room.

(Storage Unit 230)

The storage unit 230 is implemented by a read only memory (ROM) that stores programs, operational parameters, and the like used for processing in the control unit 220, and a random access memory (RAM) that temporarily stores parameters and the like that change as appropriate. According to the present embodiment, the storage unit 230 stores the information regarding the virtual space.

Although the configuration of the distribution server 20 has been described above in detail, the configuration of the distribution server 20 according to the present disclosure is not limited to the example illustrated in FIG. 3. For example, the distribution server 20 may be implemented by a plurality of devices. Furthermore, the user terminal 10 may execute at least some of the functions of the control unit 220.

<2-2. Configuration Example of User Terminal 10>

Figure 4:
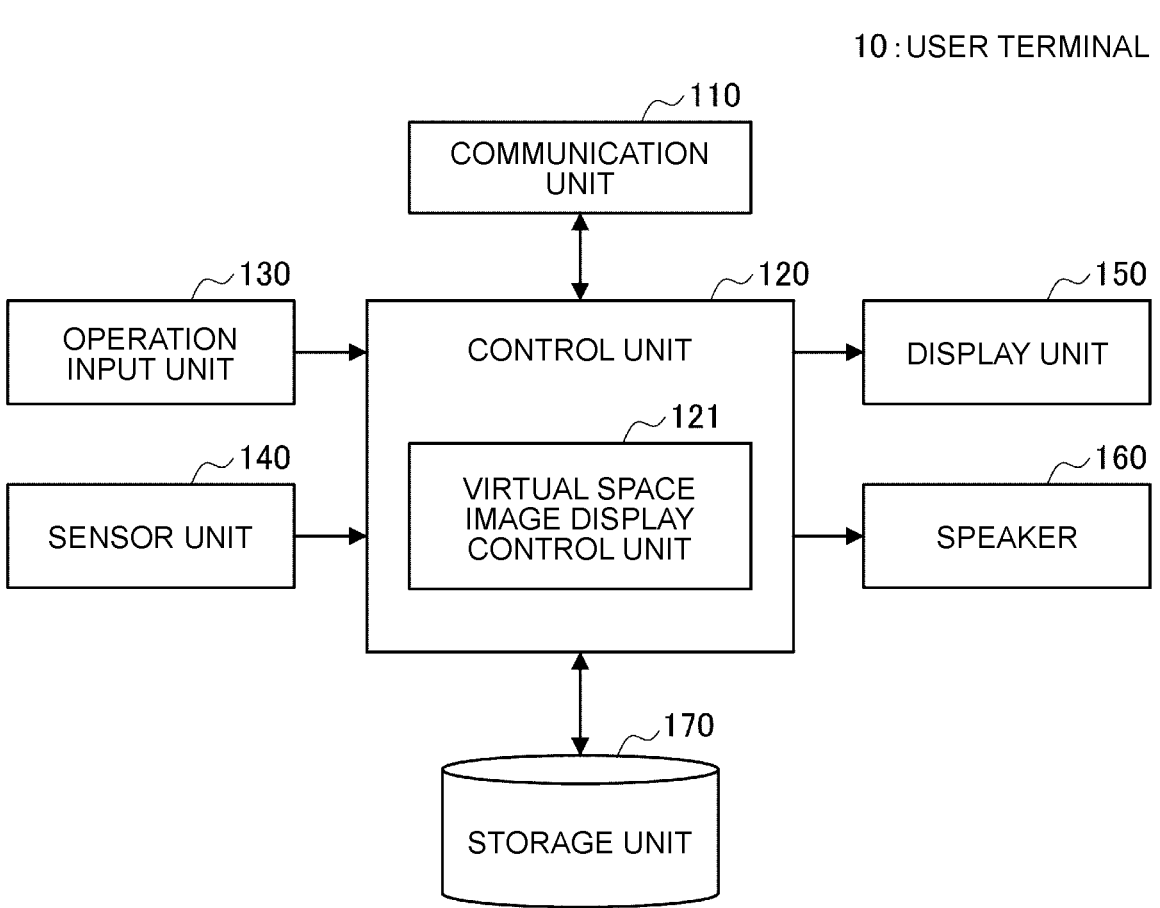
FIG. 4 is a block diagram illustrating an example of a configuration of a user terminal according to the present embodiment.

FIG. 4 is a block diagram illustrating an example of a configuration of the user terminal 10 according to the present embodiment. As illustrated in FIG. 4, the user terminal 10 includes a communication unit 110, a control unit 120, an operation input unit 130, a sensor unit 140, a display unit 150, a speaker 160, and a storage unit 170.

(Communication Unit 110)

The communication unit 110 is communicably connected to the distribution server 20 in a wired or wireless manner to transmit and receive data. The communication unit 110 can perform communication using, for example, a wired/wireless local area network (LAN), Wi-Fi (registered trademark), Bluetooth (registered trademark), infrared communication, a mobile communication network (the fourth-generation mobile communication system (4G) or the fifth-generation mobile communication system (5G)), or the like.

(Control Unit 120)

The control unit 120 functions as an arithmetic processing device and a control device, and controls an overall operation in the user terminal 10 according to various programs. The control unit 120 is implemented by, for example, an electronic circuit such as a central processing unit (CPU) or a microprocessor. Furthermore, the control unit 120 may include a read only memory (ROM) that stores programs, operational parameters, and the like to be used, and a random access memory (RAM) that temporarily stores parameters and the like that change as appropriate.

The control unit 120 according to the present embodiment performs control to transmit input information (operation input information, motion data, and the like) for the virtual space input from the operation input unit 130 or the sensor unit 140 from the communication unit 110 to the distribution server 20. Furthermore, the control unit 120 may transmit the input information (operation input information, motion data, and the like) for the virtual space to the user terminal 10 based on information acquired from an external device such as a sensor device worn by the user, a camera arranged around the user, or a controller held by the user.

Furthermore, the control unit 120 can also function as a virtual space image display control unit 121. The virtual space image display control unit 121 performs control to display video data of the user viewpoint in the virtual space transmitted from the distribution server 20 (so-called VR streaming distribution) on the display unit 150.

Furthermore, the virtual space image display control unit 121 may perform control to generate the video data of the user viewpoint in the virtual space based on information for generating the video data of the user viewpoint in the virtual space and display the video data on the display unit 150, the information being transmitted from the distribution server 20. That is, the virtual space image display control unit 121 can construct the virtual space locally based on the information received from the distribution server 20. Furthermore, at this time, the virtual space image display control unit 121 also performs update based on update information continuously transmitted in real time from the distribution server 20. The virtual space image display control unit 121 can also perform control in such a way that the performer avatar in the virtual space travels (moves) in an area in which the user avatar corresponding to the user is arranged based on the characteristic of the user. Furthermore, the virtual space image display control unit 121 transmits, to the distribution server 20 (for synchronization), the input information (operation input information, motion data, or the like) for the virtual space acquired from the operation input unit 130, the sensor unit 140, the sensor device worn by the user, the controller held by the user, or the like.

The control unit 120 also performs control to reproduce, from the speaker 160, sound data transmitted from the distribution server 20 together with the video data of the user viewpoint in the virtual space.

(Operation Input Unit 130)

The operation input unit 130 receives an operation instruction of the user and outputs an operation content to the control unit 120. The operation input unit 130 may be, for example, a touch sensor, a pressure sensor, or a proximity sensor. Alternatively, the operation input unit 130 may be a physical component such as a button, a switch, or a lever.

(Sensor Unit 140)

The sensor unit 140 has a function of sensing, for example, the position (three-dimensional position coordinates, two-dimensional position coordinates, movement information, or the like) of the user, the motion of the limbs, the posture, the orientation of the head, a line-of-sight direction, a facial expression, or the like. More specifically, the sensor unit 140 may be a position information acquisition unit, a camera (inward/outward camera), a microphone, an acceleration sensor, an angular velocity sensor, a geomagnetic sensor, a biosensor (detection of the pulse, heart rate, sweating, blood pressure, body temperature, respiration, myoelectric value, brain wave, and the like), or the like. Furthermore, the sensor unit 140 may include a nine-axis sensor including a three-axis gyro sensor, a three-axis acceleration sensor, and a three-axis geomagnetic sensor. Furthermore, the sensor unit 140 may be a line-of-sight detection sensor (infrared sensor) that detects the line of sight of the user.

(Display Unit 150)

The display unit 150 has a function of displaying the video data (image) of the user viewpoint in the virtual space. For example, the display unit 150 may be a display panel such as a liquid crystal display (LCD) or an organic electro luminescence (EL) display. Furthermore, the display unit 150 may be implemented by a non-transmissive HMD that covers the entire field of view. In this case, the display unit 150 displays a left-eye image and a right-eye image on the left and right screens respectively fixed to the left and right eyes of the user. The screen of the display unit 150 is implemented by, for example, a display panel such as a liquid crystal display (LCD) or an organic EL display, or a laser scanning display such as a retinal direct projection display. Furthermore, the display unit 150 may include an imaging optical system that enlarges and projects a display screen to form an enlarged virtual image having a predetermined view angle on the pupil of the user.

(Speaker 160)

The speaker 160 outputs sound data under the control of the control unit 120. For example, in a case where the user terminal 10 is implemented as an HMD, the speaker 160 may be implemented as a headphone worn on the head of the user, an earphone, or a bone conduction speaker.

(Storage Unit 170)

The storage unit 170 is implemented by a read only memory (ROM) that stores programs, operational parameters, and the like used for processing in the control unit 120, and a random access memory (RAM) that temporarily stores parameters and the like that change as appropriate.

In the storage unit 170 according to the present embodiment, for example, user avatar information (character 3D model data) may be stored, or the information regarding the virtual space received from the distribution server 20 may be stored.

Although the configuration of the user terminal 10 has been described above in detail, the configuration of the user terminal 10 according to the present disclosure is not limited to the example illustrated in FIG. 4. For example, the user terminal 10 may be implemented by a plurality of devices. Specifically, the user terminal 10 may be implemented by a system configuration including an output device (corresponding to at least the display unit 150 and the speaker 160) implemented by an HMD or the like and an information processing terminal (corresponding to at least the control unit 120) implemented by a smartphone, a tablet terminal, a PC, or the like.

Furthermore, the user terminal 10 may be a non-wearable device such as a smartphone or a tablet terminal.

3. Performer Avatar Traveling Control Based on Characteristic of User

Next, performer avatar traveling control based on the characteristic of the user according to the present embodiment will be specifically described with reference to the drawings.

FIG. 5 is a flowchart illustrating an example of a flow of operation processing for the performer avatar traveling control based on the characteristic of the user according to the present embodiment. The operation processing illustrated in FIG. 5 describes traveling control performed as one of production of an event (VR event) performed in a virtual space. Although not illustrated, when the VR event is performed in real time, motion capture data (also referred to as motion data) of the performer acquired by the motion capture camera 31 is transmitted from the performer terminal 30 to the distribution server 20. Further, sound data of the performer collected by the microphone 32 is also transmitted from the performer terminal 30 to the distribution server 20. These processings can be performed continuously in parallel throughout the execution of the event. In addition, input information (an instruction related to the production or the like) from the event management terminal 50 is also appropriately transmitted to the distribution server 20. The distribution server 20 can acquire various types of real-time information of the performer, the instruction related to the production, and the like, and reflect the information in the virtual space. In this way, while the event progresses, a performance called traveling of the performer avatar can be performed according to a predetermined trigger. Hereinafter, operation processing for production of the traveling will be described.

As illustrated in FIG. 5, first, the traveling control unit 223 of the distribution server 20 detects occurrence of a trigger for start of traveling of the performer avatar in the virtual space (step S103). The trigger is not particularly limited, and examples of the trigger include a case where there is an operation input from the distributor side, a case where a specific situation occurs in the event, and the like.

Next, the traveling control unit 223 acquires the characteristic of the user participating in the event (step S106). The characteristic of the user is information related to the event performed in the virtual space. Examples of the characteristic of the user include the real-time position and movement of the user avatar at the event, a behavior history (for example, carrying out a predetermined mission), and contribution (information based on the number of times the user participated in the event, a charging amount for the performer, a rank of the user, or the like) to the event and the performer appearing in the event. A real-time charging amount when the traveling starts may also be considered as the characteristic of the user.

Next, the traveling control unit 223 controls the traveling of the performer avatar in such a way that the performer avatar passes near the user avatar whose characteristic satisfies a condition (step S109). More specifically, after determining a traveling route passing near the user avatar whose characteristic satisfies the condition, the traveling control unit 223 moves the performer avatar to travel according to the traveling route.

The traveling control operation processing according to the present embodiment has been described above. The operation processing illustrated in FIG. 5 is an example, and the present disclosure is not limited to the example illustrated in FIG. 5.

4. Modified Example

Next, a modified example according to the present embodiment will be described. The virtual space management unit 221 of the distribution server 20 may further perform special display control on the user avatar whose characteristic of the user satisfies the condition while the performer avatar traveling control is performed by the traveling control unit 223. By performing the performer avatar traveling control and the special user avatar display control, interaction between the performer and the user is more emphasized, and connection between the performer and the viewer is further improved. Hereinafter, the description will be given with reference to FIG. 6.

FIG. 6 is a flowchart illustrating an example of a flow of operation processing for the user avatar display control based on the characteristic of the user according to the modified example of the present embodiment.

As illustrated in FIG. 6, first, the virtual space information providing unit 222 of the distribution server 20 acquires the characteristic of the user participating in the event (step S203). The characteristic of the user to be acquired may be the same as, at least partially overlap with, or be different from the characteristic of the user used for determining the above-described traveling route.

Next, the virtual space information providing unit 222 performs the special display control on the user avatar whose characteristic satisfies the condition (step S206). For example, connection between the performer and the user can be further emphasized by spotlighting, enlarging, or moving, to the front of the audience area, the user avatar (the user avatar whose characteristic satisfies the condition) to which the performer avatar approaches during the traveling.

Examples of the characteristic of the user include a charge amount for the event or the performer, a rank of the user, a real-time motion of the user avatar (for example, a cheering motion, a reaction motion to a performer's action, or a dance (swing)), a sound such as a call, a behavior history in the event, the number of times the user participated in the event, a specific qualification (whether or not the user has joined a community such as a fan club), and the like. The traveling control unit 223 may determine whether or not the characteristics of all the users participating in the event satisfy the condition based on absolute or relative criteria.

Furthermore, examples of the special user avatar display control include a change to a predetermined display format, movement of the position in the virtual space, release of a restriction, and the like.

Examples of the change to the predetermined display format include highlighting the user avatar whose characteristic exceeds a threshold. Examples of the highlighting include spotlighting the user avatar, enlarging the user avatar, changing the color of the user avatar, making a stand appear under the feet of the user avatar, applying an effect to the user avatar, and the like.

Examples of the movement of the position include moving the user avatar whose characteristic exceeds the threshold (a charge amount exceeds a threshold, the degree of matching between an example of a choreography and a motion (swing) of the user avatar exceeds a threshold, and the like) to the front of the audience area (near the stage) or onto the stage.

Examples of the release of the restriction include eliminating a movement restriction in the event venue for the user avatar whose characteristic exceeds the threshold (even in a case where the audience area is divided into blocks, the user avatar can freely move to another block, go up to the stage, or the like), releasing a restriction on the volume of a call uttered from the user avatar (the volume can be made louder than that of other user avatars), enabling the user avatar to operate the stage or the production of the venue (lighting, special effects, or the like), and the like. The release of the restriction may be clearly indicated by, for example, hiding a fence (a fence that divides the audience area into blocks) around the target user avatar only for the user, displaying a special passage (3D object) connecting the target user avatar and the stage, or displaying a button for stage production (3D object) around the target user avatar.

In a case where the user avatar specially moves due to the movement of the position, the release of the restriction, or the like, the virtual space management unit 221 may perform control to return the user avatar to the original position at a predetermined timing (for example, at a timing when the traveling of the performer avatar ends). As a result, it is possible to return all the audiences to the fixed positions and then start playing the next music.

Furthermore, the virtual space management unit 221 can also temporarily force the surrounding user avatars to behave in the same manner as the user avatar whose characteristic exceeds the threshold (for example, the swing motion is powerful). A performance in which one user avatar takes over the surrounding user avatars can be implemented.

The modified example according to the present embodiment has been described above. The above-described special display control for the user avatar whose characteristic satisfies the condition is not limited to a period during which the performer avatar is traveling. Even in a case where the performer avatar is not traveling, for example, the distributor side including the performer may designate a specific user avatar based on the characteristic of each user, and the virtual space information providing unit 222 may perform the special display control on the designated user avatar. Furthermore, the virtual space information providing unit 222 may perform the special display control on the designated user avatar at the start or end of the event.

Furthermore, the virtual space management unit 221 may perform control to group the user avatars based on the characteristics and limit movement of each group within a certain section for a certain period of time.

5. Supplement

The preferred embodiments of the present disclosure have been described in detail above with reference to the accompanying drawings, but the present technology is not limited to such examples. It is obvious that a person having ordinary knowledge in the technical field of the present disclosure can conceive various changes or modifications within the scope of the technical idea described in the claims, and it is naturally understood that the changes or modifications also fall within the technical scope of the present disclosure.

For example, the above-described function (traveling control) of the traveling control unit 223 may be performed by the user terminal 10. As a result, the traveling route can be individually determined for each user terminal 10 based on the characteristic of the user.

In addition, it is also possible to create a computer program for causing hardware such as the CPU, the ROM, and the RAM built in the user terminal 10 or the distribution server 20 described above to execute the function of the user terminal 10 or the distribution server 20. Furthermore, a computer-readable storage medium storing the computer program is also provided.

Furthermore, the effects described in the present specification are merely illustrative or exemplary, and are not restrictive. That is, the technology according to the present disclosure can exhibit other effects obvious to those skilled in the art from the description of the present specification together with or instead of the above effects.

Note that the present technology can also have the following configurations.

1. An information processing device comprising:
   a control unit that performs control to output information regarding an image of a user viewpoint in a virtual space to a user terminal,
   wherein the control unit
   acquires a characteristic of at least one user related to an event performed in the virtual space and controls movement of a position of an indicator corresponding to a performer in the virtual space based on a position of an indicator corresponding to at least one user whose characteristic satisfies a condition.

2. The information processing device according to claim 1,
   wherein the indicator corresponding to the user is an image of a user avatar, and
   the indicator corresponding to the performer is an image of a performer avatar.

3. The information processing device according to claim 2, wherein the control unit moves the performer avatar in such a way as to sequentially pass near a position of at least one user avatar whose characteristic satisfies the condition in the virtual space.

4. The information processing device according to claim 2, wherein the characteristic of the user related to the event is a position, a motion, or a behavior history of the user avatar in the virtual space.

5. The information processing device according to claim 2, wherein the characteristic of the user related to the event includes a charge amount of the user, the number of times the user participated in the event, and whether or not the user has joined a community of the performer.

6. The information processing device according to claim 2, wherein the control unit performs special display control in the virtual space on a user avatar whose characteristic of the user satisfies the condition.

7. The information processing device according to claim 6, wherein the control unit performs, as the special display control, at least one of highlighting the user avatar, moving the position of the user avatar, or releasing a predetermined restriction on the user avatar.

8. An information processing terminal comprising:
   a control unit that performs control to display an image of a user viewpoint in a virtual space on a display unit,
   wherein the control unit
   acquires a characteristic of a user related to an event performed in the virtual space and controls movement of a position of an indicator corresponding to a performer in the virtual space based on a position of an indicator corresponding to the user in a case where the characteristic satisfies a condition.

9. An information processing method executed by a processor, the information processing method comprising:
   performing control to output information regarding an image of a user viewpoint in a virtual space to a user terminal; and
   acquiring a characteristic of at least one user related to an event performed in the virtual space and controlling movement of a position of an indicator corresponding to a performer in the virtual space based on a position of an indicator corresponding to at least one user whose characteristic satisfies a condition.

10. A program that causes a computer to function as:

a control unit that performs control to output information regarding an image of a user viewpoint in a virtual space to a user terminal, wherein the control unit acquires a characteristic of at least one user related to an event performed in the virtual space and controls movement of a position of an indicator corresponding to a performer in the virtual space based on a position of an indicator corresponding to at least one user whose characteristic satisfies a condition.

(11)

A system including:

a server that distributes information regarding a virtual space; and a user terminal that displays an image of a user viewpoint in the virtual space, in which the server includes a control unit that performs control to output information regarding the image of the user viewpoint in the virtual space to the user terminal, and the control unit acquires a characteristic of at least one user related to an event performed in the virtual space and controls movement of a position of an indicator corresponding to a performer in the virtual space based on a position of an indicator corresponding to at least one user whose characteristic satisfies a condition.

REFERENCE SIGNS LIST

10 USER TERMINAL
121 VIRTUAL SPACE IMAGE DISPLAY CONTROL UNIT
20 DISTRIBUTION SERVER
221 VIRTUAL SPACE MANAGEMENT UNIT
222 VIRTUAL SPACE INFORMATION PROVIDING UNIT
223 TRAVELING CONTROL UNIT

The invention claimed is:

1. An information processing system comprising:
circuitry configured to
    control output of information regarding an image of a user viewpoint in a virtual space to a user terminal,
    receive a characteristic of at least one user related to an event performed in the virtual space,
    control movement of a position of an indicator corresponding to a performer in the virtual space based on a position of an indicator corresponding to at least one user whose characteristic satisfies a condition,
    wherein the indicator corresponding to each user includes an image of a user avatar, and
    wherein the indicator corresponding to the performer includes an image of a performer avatar, and
    control movement of the position of the performer avatar in such a way as to pass near the position of each user avatar of the at least one user avatar corresponding to each user of the at least one user whose characteristic satisfies the condition in the virtual space.

2. The information processing system according to claim 1,
    wherein the characteristic of the at least one user related to the event includes at least one of a position, a motion, or a behavior history of the user avatar in the virtual space.

3. The information processing system according to claim 1,
    wherein the characteristic of the at least one user related to the event includes at least one of a charge amount of the user, a number of times the user participated in the event, or whether the user has joined a community of the performer.

4. The information processing system according to claim 1,
    wherein the circuitry performs special display control in the virtual space on a user avatar whose characteristic of the user satisfies the condition.

5. The information processing system according to claim 4,
    wherein the circuitry performs, as the special display control, at least one of highlighting the user avatar, moving the position of the user avatar, or releasing a predetermined restriction on the user avatar.

6. An information processing terminal comprising:
circuitry configured to
    control display of an image of a user viewpoint in a virtual space on a display,
    receive a characteristic of a user related to an event performed in the virtual space,
    control movement of a position of an indicator corresponding to a performer in the virtual space based on a position of an indicator corresponding to the user in a case where the characteristic satisfies a condition,
    wherein the indicator corresponding to each user includes an image of a user avatar, and
    wherein the indicator corresponding to the performer includes an image of a performer avatar, and
    control movement of the position of the performer avatar in such a way as to pass near the position of each user avatar of the at least one user avatar corresponding to each user of the at least one user whose characteristic satisfies the condition in the virtual space.

7. An information processing method executed by a processor, the information processing method comprising:
    controlling output of information regarding an image of a user viewpoint in a virtual space to a user terminal;
    receiving a characteristic of at least one user related to an event performed in the virtual space;
    controlling movement of a position of an indicator corresponding to a performer in the virtual space based on a position of an indicator corresponding to at least one user whose characteristic satisfies a condition,
    wherein the indicator corresponding to each user includes an image of a user avatar, and
    wherein the indicator corresponding to the performer includes an image of a performer avatar; and
    controlling movement of the position of the performer avatar in such a way as to pass near the position of each user avatar of the at least one user avatar corresponding to each user of the at least one user whose characteristic satisfies the condition in the virtual space.

8. A non-transitory computer-readable storage medium having embodied thereon a program, which when executed by a computer causes the computer to execute a method, the method comprising:
    controlling output of information regarding an image of a user viewpoint in a virtual space to a user terminal;
    receiving a characteristic of at least one user related to an event performed in the virtual space;

controlling movement of a position of an indicator corresponding to a performer in the virtual space based on a position of an indicator corresponding to at least one user whose characteristic satisfies a condition, wherein the indicator corresponding to each user includes an image of a user avatar, and wherein the indicator corresponding to the performer includes an image of a performer avatar; and controlling the position of the performer avatar in such a way as to sequentially pass near the position of each user avatar of the at least one user avatar corresponding to each user of the at least one user whose characteristic satisfies the condition in the virtual space.

\* \* \* \* \*